INVENTOR
Juan Celada
BY
Curtis, Morris & Safford
ATTORNEYS

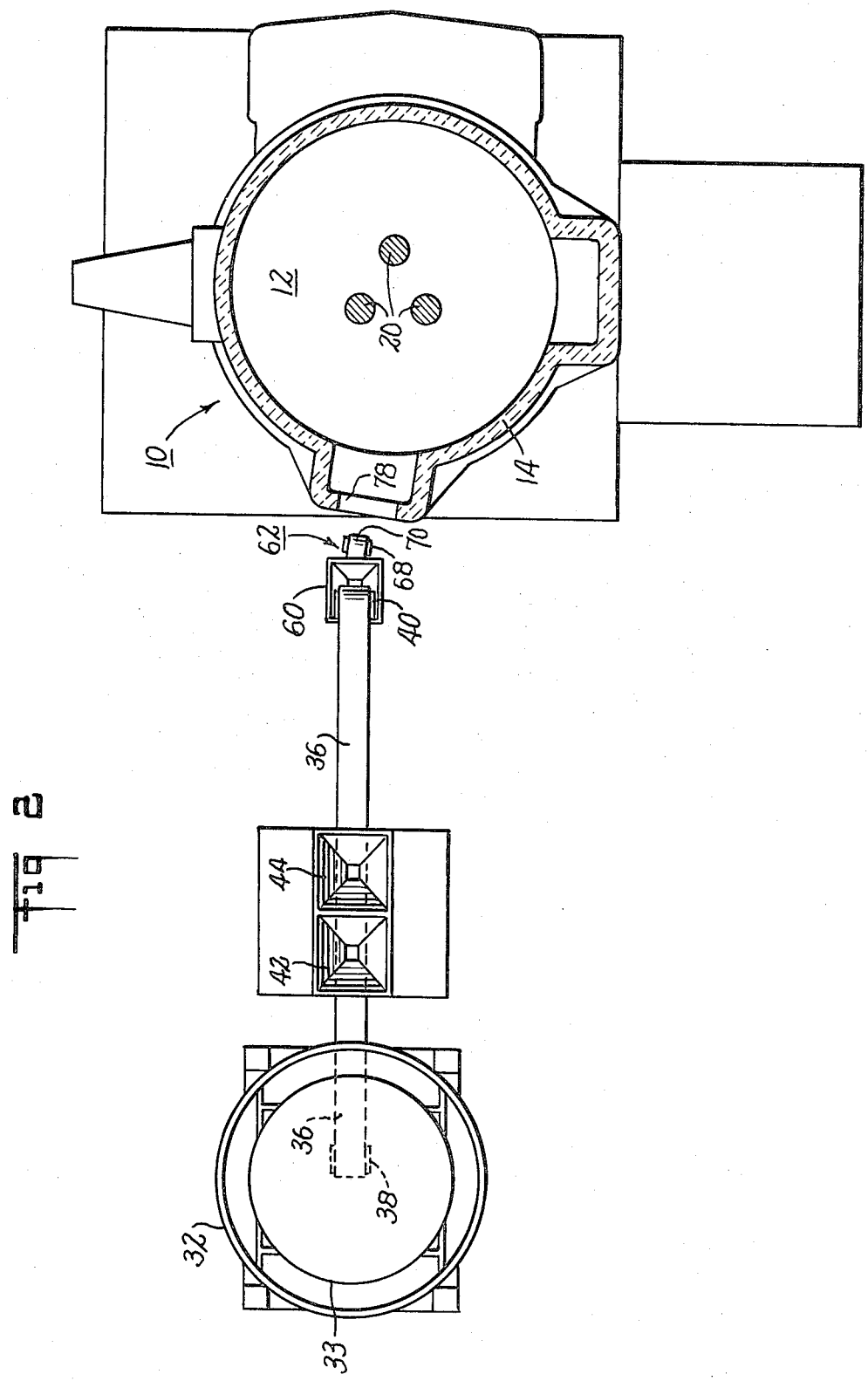

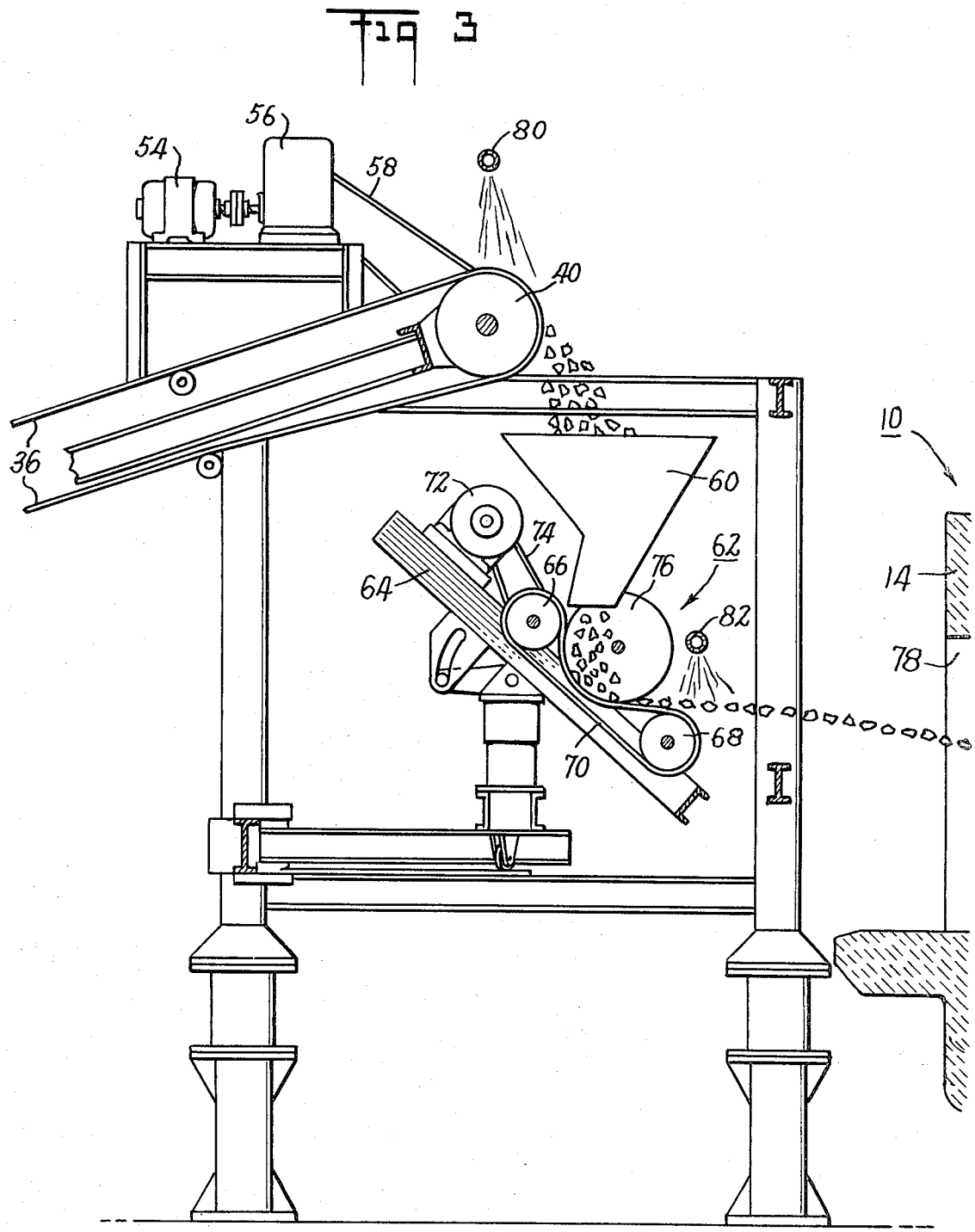

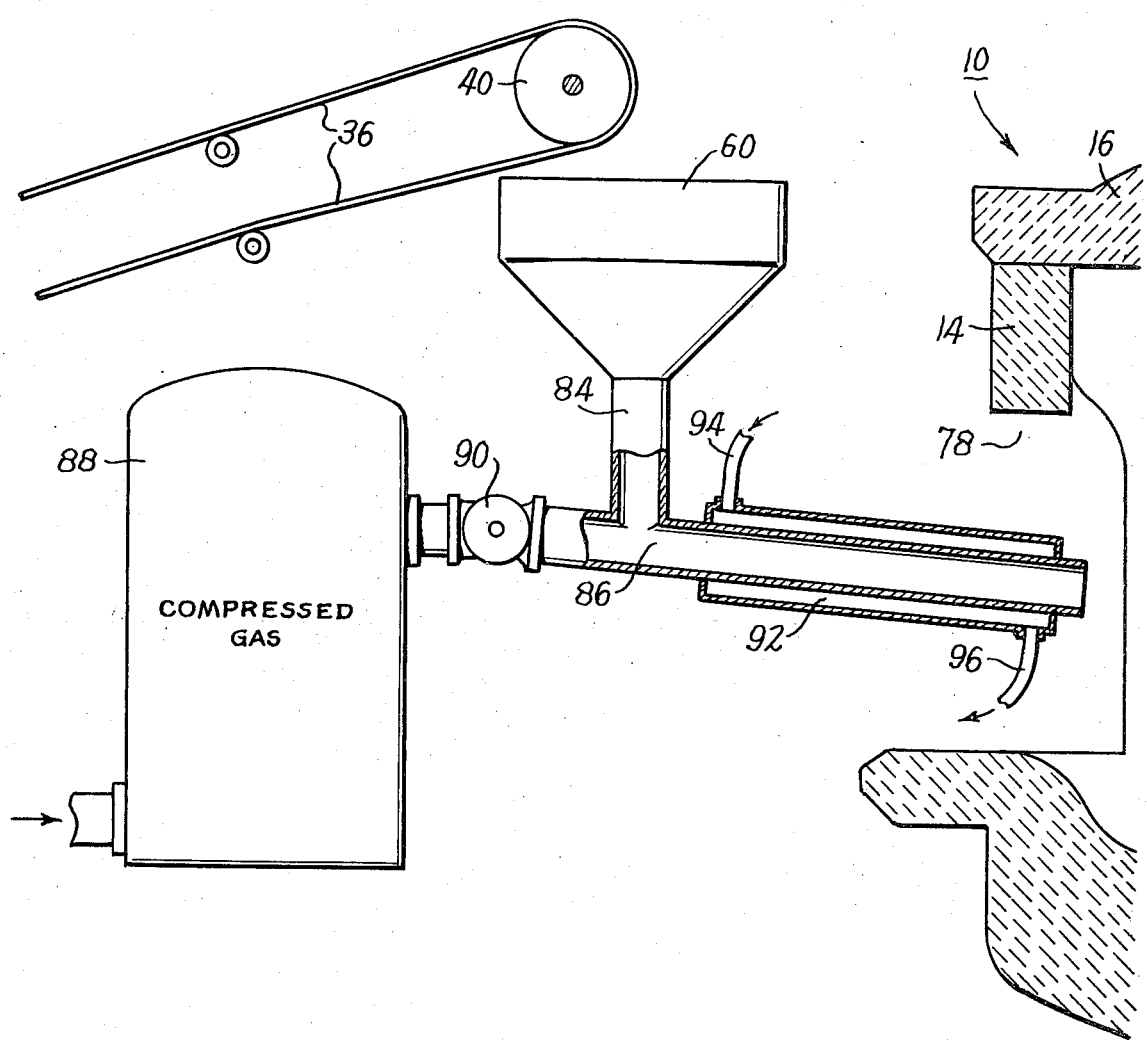

United States Patent Office 3,681,049
Patented Aug. 1, 1972

3,681,049
METHOD OF CHARGING ELECTRIC ARC STEELMAKING FURNACE
Juan Celada, Monterrey, Nuevo Leon, Mexico, assignor to Fierro Esponja, S.A., Monterrey, Nuevo Leon, Mexico
Filed July 17, 1969, Ser. No. 842,617
Claims priority, application Mexico, Aug. 16, 1968, 105,284
Int. Cl. C21c 5/52; C22b 9/00; H05b 31/04
U.S. Cl. 75—12
6 Claims

ABSTRACT OF THE DISCLOSURE

A method of continuously charging an electric arc steelmaking furnace is disclosed which generates an opaque atmosphere in the furnace capable of reducing substantially the transmittance of radiant heat from the arc to the refractory lining of the furnace thereby decreasing the rate at which the furnace lining deteriorates. The opaque atmosphere is generated by including in the charge a proportion of very fine particles capable of being suspended in the furnace atmosphere to form an opaque dust suspension therein. The charge is forcibly and laterally injected into the furnace to generate the dust suspension therein. The dust-generating particles should desirably be of less than 140 mesh size. Charging apparatus for injecting the particulate charge into the furnace is also disclosed.

---

This invention relates to electric arc steelmaking furnaces and more particularly to an improved method and apparatus for continuously charging an electric furnace with sponge iron.

One of the problems encountered in the operation of electric arc furnaces arises out of the fact that the high arc temperature produces high temperature radiation which, if it impinges on the refractory lining of the furnace, tends to cause a relatively rapid deterioration of the refractory material. Numerous proposals have been made for protecting the refractory linings of arc furnaces from such radiation. For example, in the conventional batch operation of such electric furnaces some measure of protection can be achieved by piling unmelted portions of the charge material against the furnace walls and/or by submerging the lower ends of the electrodes in the unmelted material within the furnace.

In recent years there has been an increasing interest in semi-batch operation of electric furnaces with continuous feeding. In such semi-batch operation a pool of molten steel is initially formed at the bottom of the furnace, and then the furnace is charged by continuously feeding iron-bearing material in particulate form, e.g., sponge iron, as well as the required steelmaking additives, thereto. The operating temperature of the furnace can be controlled by varying the power supply to the electrodes or the charge feed rate or both. Such continuous charging makes it possible to operate the furnace at a refining temperature, e.g., 2600° to 2900° F. during the charging step. Thus the charging, melting and refining steps can be carried out simultaneously, thereby reducing the time required for a given heat. Also the energy required per heat is usually reduced both because of the shorter operating time and because more nearly uniform heating is obtained with continuous feed of the sponge. Semi-batch operation of this type is disclosed in British Pat. 1,104,690 and in a paper by Sibakin et al. presented at the 75th General Meeting of American Iron and Steel Institute, May 1967.

In such a semi-batch operation it is not practical to use the techniques mentioned above in connection with batch operation for protecting the furnace walls, since these techniques depend upon the presence in the furnace of substantial amounts of unmelted material. With continuous feed of particulate iron-bearing material, the amount of unmelted material in the furnace at any given time is relatively small and the contents of the furnace have a relatively flat profile, i.e., an essentially planar upper surface. In order to protect the furnace walls under these circumstances it has been proposed that a foamy slag be generated to envelop the lower ends of the electrodes. While such a foamy slag may inhibit direct radiation from the arc to the furnace walls, it does not reduce radiation from the slag itself to the walls. Also foaming of the slag undesirably increases the volume of slag in the furnace.

It is accordingly an object of the present invention to provide a method of protecting the refractory lining of an electric arc steelmaking furnace during the continuous feeding of a charge of particulate iron-bearing material thereto. It is another object of the invention to provide a method of prolonging the life of the refractory lining under such circumstances and decreasing the unproductive time required for repairing damaged linings, as well as decreasing the heat wasted due to heat loss incidental to shutting down the furnace for repairs. It is still another object of the invention to improve the thermal economy of a continuously fed electric furnace. It is a still further object of the invention to provide a charging apparatus which is particularly effective in practicing the methods disclosed herein. Other objects of the invention will be in part obvious and in part pointed out hereafter.

In one of its broader aspects the invention comprises establishing and maintaining above the molten bath in the furnace an atmosphere that is largely opaque to radiant heat emitted by the arc and upper surface of the bath. It has been found that by including in the continuous charge to the furnace a certain proportion of very fine particles and by properly introducing the charge into the furnace, a suspension of the fine particles in the furnace atmosphere is produced that has a high degree of opacity to radiant heat. Thus a controlled dusty atmosphere is produced in the furnace to inhibit transmittance of radiant heat from the arc to the furnace walls.

The chemical composition of the particles used to generate the dust suspension does not appear to be particularly critical. Thus the particles may be very finely divided sponge iron or alternatively particles of additives such as lime, carbon or iron oxide which are conventionally used in the refining process in the furnace.

Among the factors which have been found to be important in achieving a furnace atmosphere having the desired opacity are the proportion of suspension- or dust-generating particles in the materials fed to the furnace, the particle size of the particles and the manner in which the material is charged to the furnace. In general, the charge should contain a sufficient proportion of the very fine particles to produce a relatively dense suspension in the furnace atmosphere. However, as the concentration of dust particles increases, a point is reached at which no significant increase in opacity occurs. Moreover, if too high a proportion of fine material is employed, loss of the fine particles, including iron units, to the environment through openings in the furnace, e.g., the roof openings through which the electrodes pass, becomes excessive. It has been found that in most cases the proportion of dust-generating particles should preferably be within the range 5% to 25% of the total weight of the charge. In order to achieve an effective suspension of the particles in the furnace atmosphere, the particle size of the dust particles should desirably be less than 140-mesh.

For the reasons given above, it is desirable that the density of the suspension in the furnace atmosphere be carefully controlled. In some cases the sponge iron to be fed to the furnace may already contain a sufficient quantity of sufficiently fine particles to form the desired opaque atmosphere, whereas in other cases it may be necessary to supplement the sponge iron "fines" with finely divided additives such as lime, carbon or iron oxide. Also the quantity of fine material can be increased by grinding one or more components of the furnace feed. Primarily, the density of the furnace atmosphere is controlled by regulating the amount and size of the fine particles in the mixture fed to the furnace. As pointed out below, a secondary control can be obtained by spraying a regulated amount of water on the feed material just before it enters the furnace.

While the sponge iron and additives may, if desired, be separately charged into the furnace, it has been found preferable to premix the sponge iron and additives before they are introduced into the furnace. By premixing the additives with the sponge iron better distribution of the additives through the particulate iron-bearing material is obtained and more efficient refining achieved in the furnace.

As more fully described below in connection with the drawings, the continuous charging of the furnace is preferably carried out by forcibly injecting the feed materials laterally into the furnace through a side opening well above the surface of the molten bath in the furance. It has been found that more effective suspension of the duct particles in the furnace atmosphere is achieved by this mode of introducing the charge into the furnace than if they are, for example, fed by gravity through the furnace roof.

In order to point out more fully the nature of the present invention, reference will now be made to the accompanying drawings which illustrate apparatus incorporating a preferred embodiment of the apparatus invention and capable of being used to carry out a preferred embodiment and a modification of the method invention.

In the drawings:

FIG. 2 is an essentially top plan view of the apparatus of FIG. 1 showing the furnace in horizontal section.

FIG. 3 is an enlarged side elevation of a portion of the feed mechanism of FIG. 1, particularly showing the centrifugal slinger.

FIG. 4 is a side elevation of a modified form of feeding apparatus.

Figure 1:
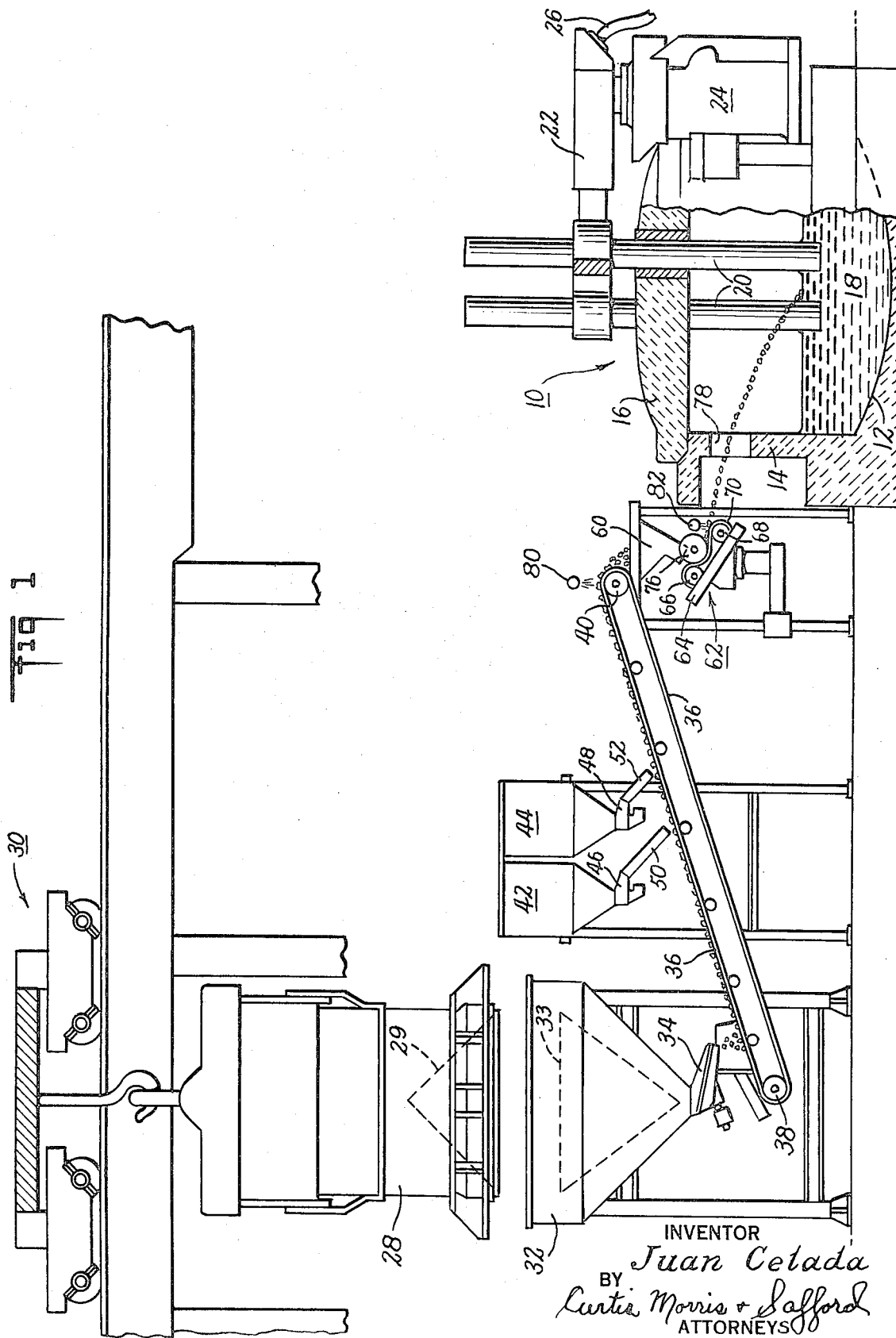
FIG. 1 is a side elevation of an electric arc furnace showing the furnace in vertical section and feeding apparatus for continuously feeding a charge to the furnace.

Referring to FIG. 1 and, more particularly, the lower right-hand portion thereof, the numeral 10 generally designates a conventional electric arc steelmaking furnace having the hearth 12, side wall 14 and removable dome or roof 16, all of which are lined with refractory material in the usual manner. A molten steel bath 18 is shown in the bottom of the furnace. Extending down through the dome or roof 16 are the electrodes 20 supported from a bracket 22 mounted on the usual mechanism 24 for raising and lowering the electrodes. Power is supplied to the furnace through conductors 26.

The sponge iron to be used in charging the furnace is brought to the furnace area in a bucket 28, having a conical discharge closure 29, by means of a crane 30. From bucket 28 sponge iron is dropped into the peripheral portion of a hopper 32. The inner surface of the body of sponge iron in hopper 32 is indicated by dotted line 33. From hopper 32 the sponge iron passes through a flow regulator 34 to a conveyor belt 36 mounted on the pulleys 38 and 40. As it moves upwardly on the conveyor belt 36, the sponge iron passes under a pair of additive hoppers 42 and 44 containing additives such as lime, carbon and the like required in the refining step of the process. It is evident that while only two of these hoppers are shown in FIG. 1, more hoppers can be used if desired. The additives in the hoppers 42 and 44 flow through regulators 46 and 48 and chutes 50 and 52, respectively, from which they are discharged on the conveyor 36 to combine with the sponge iron thereon.

Referring now to FIG. 3 of the drawings, the conveyor 36 is driven through upper pulley 44 by a motor 54, speed reducer 56 and drive belt 58. As the conveyor passes over the pulley 44, the mixture of sponge iron and additives is dropped into a hopped 60 from which it is delivered to a centrifugal slinger generally indicated by the numeral 62. The slinger comprises a supporting frame 64 on which are rotatably mounted a pair of pulleys 66 and 68 over which a conveyor belt 70 passes. The conveyor belt is driven through pulley 66 by a motor 72 and drive belt 74. The central upper portion of belt 70 is depressed by a pair of idler rolls 76 (only one of which is shown) which bear against the side edges of the belt causing the upper surface of the belt to assume a concave configuration such that the belt runs substantially vertically as it leaves pulley 66 and substantially horizontally as it approaches pulley 68.

The mixture of sponge iron and additives from the hopper 60 drops onto the belt 70 between the rolls 76. The belt is driven at a high linear speed, e.g., 1500 feet per minute, and the sponge iron dropping thereon is rapidly accelerated to this speed. Thus as the belt passes over pulley 68 the mixture of sponge iron and additives is projected forcibly and laterally through the opening 78 in the side wall 14 of the furance.

Reverting to FIG. 1, the trajectory of the stream of charge materials projected through the opening 78 is such that most of these materials fall in the space defined by the three electrodes 20. As pointed out above, due to the presence of a substantial proportion of very fine material in the charge, a suspension of fine dust is formed in the furnace above the surface of pool 18. This dust suspension is largely opaque to radiant heat and thus protects the side walls of the furnace, as well as the bottom of roof 16. As indicated above, it has been found that the relatively high speed lateral projection of the charge into the furnace plays an important role in securing the desired suspension of the fine particles and the formation of the opaque atmosphere. Also the lateral projection of the charge promotes desirable distribution of the charge in the furnace and makes it unnecessary to provide roof 16 with charge-feeding connections which must be disconnected when the electrodes are withdrawn and the roof removed for access to the interior of the furnace.

As shown in FIG. 3, mounted above the pulley 44 there is a spray head 80 and a similar spray head 82 is provided above the pulley 68. These spray heads are positioned to spray water in the mixture of sponge iron and additives passing under them. It has been found that these water sprays are a useful means of rapidly regulating the concentration of dust in the furnace atmosphere to maintain it within the desired range.

Turning now to FIG. 4 of the drawings, a modification of the apparatus for carrying out the method of the invention is disclosed. In this modified apparatus the mixture of sponge iron and additives falling into hopper 60 is conducted through a vertical discharge tube 84 to an accelerating tube 86 that is essentially horizontal but has a slight downward slope and terminates just inside the opening 78 of the wall 14 of the furnace. In the modification of FIG. 4, the charge material is injected into the furnace by a pressure fluid which may be, for example, gas, air or steam. The pressure fluid from a suitable source 88 accelerates the charge material in tube 86 and projects it into the furnace. If desired, the tube 86 may be provided with a pulsing valve 90 to produce a pulsed flow of the pressure fluid. Also in some cases it may be desirable to cool the discharge end of tube 86. If such cooling is necessary or desirable, it can be achieved by means of a water jacket 92 having a water inlet 94 and water outlet 96. It will be noted that the apparatus of FIG. 4, like that of FIG. 3, operates to project the charged material forcibly and laterally into the furnace.

In order to point out more fully the nature of the present invention, the results obtained in a series of 25 runs on an 80-ton capacity electric furnace will now be described. The sponge iron used in these runs contained about 7% by weight of material passing a 140-mesh screen. The average analysis of the sponge iron was as follows in percentages:

| | |
|---|---|
| Metallic iron | 69.16 |
| Total iron | 82.60 |
| Metallization | 84.10 |
| Carbon | 2.08 |
| Sulfur | 0.031 |
| Phosphorus | 0.520 |
| Gangue | 10.87 |

The maximum power input to the furnace was 17 megawatts. The temperatures given below are averages for the 25 runs. The furnace wall temperatures are averages of readings at three circumferentially spaced points on the interior wall of the furnace about midway between the top of the slag and the furnace roof.

The furnace was initially charged with 36 tons of scrap which was melted at the full power input of 17 megawatts over a period of 100 minutes. At the end of this time the temperature of the bath was 1560° C. and the wall temperature 1380° C. At this stage the bath of molten steel in the furnace had a relatively flat surface profile and the furnace wall temperature would have risen rapidly but for the fact that continuous charging was initiated in such manner as to produce an opaque atmosphere in the furnace.

Continuous charging of sponge iron was carried out at full power input by feeding 44 tons of nominally 2" sponge iron containing about 7% of minus 140-mesh material to the furnace over a period of 100 minutes. During this continuous charging period the temperature of the molten bath initially decreased and then leveled off, whereas the wall temperature, although it increased slightly, remained very nearly constant. After 50 minutes of continuous charging the bath temperature was 1510° C. and the wall temperature 1395° C., and thus there was a temperature gradient of 115° C. between the molten bath and the refractory wall. At the end of the continuous charging period the bath temperature was 1515° C. and the wall temperature 1402° C. thus giving a temperature gradient of 113° C. between the molten bath and the refractory wall.

After the continuous charging of the sponge iron had been completed, i.e., 200 minutes after the beginning of the run, the furnace was operated at the same input power of 17 megawatts for a period of 13 minutes to cause the molten bath to reach a refining temperature of 1550° C. During this 13 minute period the temperature of the refractory wall rose from 1402° C. to 1505° C. Thus in the absence of an opaque atmosphere there was a temperature difference of only 45° C. between the bath and the refractory wall.

In these test runs an opaque atmosphere was maintained in the furnace during the introduction of a major portion of the furnace charge. However, it is not essential that the opaque atmosphere be maintained in the furnace during any particular portion of the heat. For example, in some cases it is advantageous to charge the furnace to its rated capacity by a conventional batch charging and melt-down procedure, and then carry out a refining stage with a continuous feed capable of producing an opaque atmosphere and using a full power input to the furnace. Such an "over-load" mode of operation significantly increases the productivity of the furnace.

From the foregoing description it should be apparent that the present invention provides a combination of the continuous charging technique with the generation of an opaque atmosphere which results in an improved steelmaking process.

The protection of the furnace refractories achieved by using an opaque atmosphere in the furnace in accordance with the present process is obtained without loss of the advantages characteristic of continuous charging processes, and, as a matter of fact, enhances the advantages of continuous charging. These advantages include, for example, the ability to refine during at least a portion of the charging process, the ease of regulating and bringing to a desired value such constituents as phosphorous and sulfur, and the increased furnace productivity obtained with a given furnace and power supply.

In the present method the particle size distribution of the charged materials is so regulated and the charge is so projected into the electric furnace as to generate a dust cloud of the finer components of the charge materials which renders the atmosphere above the molten bath opaque to the transmittance of radiant heat. Since increasing the concentration of particles within the furnace beyond a certain point tends to produce excessive loss of material from the furnace, thus possibly producing an air pollution problem, and does not materially further enhance the control of radiant heat, the present process contemplates careful control of the dust concentration in the furnace atmosphere both by initially controlling the composition of the charge material and by regulation of the control sprays just before the charge enters the furnace.

It should be noted that the use of an opaque atmosphere as described herein not only reduces damage to the furnace wall refractories but also, by reducing radiant transmittance to the walls, improves the thermal economy of the furnace.

In the foregoing specification and the accompanying drawings we have shown and described a preferred embodiment of our invention and have suggested various alternatives and modifications thereof; but it is to be understood that these are not intended to be exhaustive and that many other changes and modifications can be made within the scope of the invention. These suggestions herein are selected and included for purposes of illustration in order that other skilled in the art will more fully understand the invention and the principles thereof and will thus be enabled to modify it and embody it in a variety of forms, each as may be best suited to the conditions of a particular use. For example, the present method may be adapted for use in furnaces other than electric arc furnaces, e.g., open hearth furnaces.

I claim:

1. A method of charging an electric arc steelmaking furnace while simultaneously protecting the lining thereof from the destructive effects of radiant energy emitted by electric arc discharge and by the surface of a bath of molten steel therein, said furnace having a plurality of spaced electrodes extending downwardly from the top thereof, which method comprises establishing a bath of molten steel at the bottom of said furnace with which the lower portions of said electrodes cooperate to form said arc, continuously feeding to said bath during at least a portion of a heat in said furnace a particulate charge selected from iron-bearing particles, steelmaking additives and combinations and mixtures of iron-bearing particles and steelmaking additives, said particulate charge being forcibly injected through an opening in said furnace above the level of said molten bath and toward a point between said electrodes, said particulate charge containing from 5% to 25% by weight of particles having a particle size less than 140-mesh to generate a dust suspension that renders the entire atmosphere in said furnace above said molten bath opaque to reduce substantially the transmittance of radiant energy from said arc and bath to the wall of said furnace, said opening being laterally spaced from the electrode area of said furnace and the force used to charge said particles being sufficient to project the nondust-forming particles of said charge into said electrode area, and supplying electrical energy to said furnace to maintain said bath substantially at a refining temperature during said continuous charging operation.

2. A method according to claim 1 wherein said particulate charge is a mixture of sponge iron and additives.

3. A method according to claim 1 wherein said charge is injected by a centrifugal slinger.

4. A method according to claim 1 wherein said charge is injected by a pressure fluid jet.

5. A method according to claim 1 wherein said particulate charge consists of sponge iron.

6. A method according to claim 1 wherein said particulate charge is injected laterally through a side opening in said furnace.

References Cited

UNITED STATES PATENTS

| | | | |
|---|---|---|---|
| 2,877,107 | 3/1959 | Magness | 75—91 |
| 3,010,796 | 7/1961 | Alexander | 13—9 |
| 3,140,168 | 7/1964 | Halley | 75—26 |
| 3,264,094 | 8/1966 | Robinson | 75—11 |
| 3,472,650 | 10/1969 | Sibakin | 75—12 |
| 3,462,538 | 8/1969 | Pelligrini | 13—9 |

OTHER REFERENCES

Kociscin, Electric Arc Furnace Operation, 859 O.G. 41 (Defensive Publication, Feb. 4, 1969).

WINSTON A. DOUGLAS, Primary Examiner
P. D. ROSENBERG, Assistant Examiner

U.S. Cl. X.R.
13—35; 75—95; 266—43